US008856165B1

(12) United States Patent  
Cierniak

(10) Patent No.: US 8,856,165 B1  
(45) Date of Patent: Oct. 7, 2014

(54) RANKING OF USERS WHO REPORT ABUSE

(75) Inventor: Michal Cierniak, Palo Alto, CA (US)

(73) Assignee: Google Inc., Mountain View, CA (US)

(*) Notice: Subject to any disclaimer, the term of this patent is extended or adjusted under 35 U.S.C. 154(b) by 111 days.

(21) Appl. No.: 12/816,719

(22) Filed: Jun. 16, 2010

Related U.S. Application Data

(60) Provisional application No. 61/318,231, filed on Mar. 26, 2010.

(51) Int. Cl.
*G06F 17/30* (2006.01)
*G06Q 10/00* (2012.01)

(52) U.S. Cl.
USPC .............................................. 707/767; 705/28

(58) Field of Classification Search
CPC ................... G06F 17/30867; G06F 17/30657; G06F 17/30861; G06F 21/31; G06F 21/55; G06F 21/577; G06F 17/274; G06F 17/30312; G06F 17/30734; G06F 15/16; G06F 17/30516; G06F 17/30528; G06F 17/30637
USPC .......................................................... 707/767
See application file for complete search history.

(56) References Cited

U.S. PATENT DOCUMENTS

| | | | |
|---|---|---|---|
| 7,680,675 B1* | 3/2010 | Kwun et al. .................. 705/1.1 |
| 2006/0031177 A1* | 2/2006 | Rule .............................. 705/80 |
| 2006/0155738 A1* | 7/2006 | Baldwin et al. .............. 707/101 |
| 2007/0220607 A1* | 9/2007 | Sprosts et al. ................. 726/24 |
| 2008/0016167 A1* | 1/2008 | Lund et al. ................... 709/206 |
| 2009/0172783 A1* | 7/2009 | Eberstadt ........................ 726/4 |
| 2009/0228294 A1* | 9/2009 | Choi et al. ...................... 705/1 |

OTHER PUBLICATIONS

Google Sidewiki, Wikipedia, retrieved from http://en.wikipedia.org.wiki/Goode Sidewiki, printed on Jun. 6, 2014, 4 pages.

* cited by examiner

*Primary Examiner* — Shyue Jiunn Hwa
(74) *Attorney, Agent, or Firm* — Harrity & Harrity, LLP

(57) ABSTRACT

A method, performed by one or more server devices, includes receiving an abuse report from a user, where the abuse report indicates that a comment associated with a document violates a policy associated with providing comments to users; retrieving a trust score of the user, where the trust score is based on a difference between a quantity of valid abuse reports previously generated by the user and a quantity of invalid abuse reports previously generated by the user; generating or adjusting a removal score of the comment based on the retrieved trust score of the user; comparing the removal score to a removal threshold; and removing the comment from further presentation to users if the removal score of the comment is greater than the removal threshold.

21 Claims, 12 Drawing Sheets

RANKING OF USERS WHO REPORT ABUSE

RELATED APPLICATIONS

This application claims priority under 35 U.S.C. §119 based on U.S. Provisional Patent Application No. 61/318,231, filed Mar. 26, 2010, the entire contents of which are hereby incorporated by reference.

BACKGROUND

Many techniques are available to users today to find information on the world wide web ("web"). For example, users often use web browsers and/or search engines to find information of interest. A user may enter a search query into a search box of a browser and the browser may submit the search query to a search engine. The search engine may identify documents that match the search query, rank the documents based on various factors, and return a ranked list of documents to the user. The user may select a document from the list and request the document. A browser may retrieve the requested document and display the document to the user in a browser window. A browser may provide additional information to a user when a user requests a document. The additional information may include content created by other users in relation to the document. Some of the content may violate provider policies and may, therefore, need to be removed. However, monitoring content for policy violations in an efficient and cost-effective manner may prove to be particularly challenging.

SUMMARY

According to one aspect, a method, performed by one or more server devices, may include receiving, by one of the one or more server devices, an abuse report from a user, where the abuse report indicates that a comment associated with a document, or associated with a content of the document, violates a policy associated with providing comments to users; retrieving, by a processor associated with the one or more server devices, a trust score of the user, where the trust score is based on a difference between a quantity of valid abuse reports previously generated by the user and a quantity of invalid abuse reports previously generated by the user; generating or adjusting, by a processor associated with the one or more server devices, a removal score of the comment based on the retrieved trust score of the user; comparing, by a processor associated with the one or more server devices, the removal score to a removal threshold; and removing, by a processor associated with the one or more server devices, the comment from further presentation to users if the removal score of the comment is greater than the removal threshold.

According to another aspect, a server device may include a memory to store a user profile that includes a trust score of a user, where the trust score is based on a difference between a quantity of valid abuse reports previously generated by the user and a quantity of invalid abuse reports previously generated by the user; and a processor to execute instructions to implement an abuse report manager; a removal component; an abuse report review queue; and a manual review interface; where the abuse report manager may receive an abuse report from the user, where the abuse report indicates that a comment, associated with a document, or associated with a content of the document, violates a policy associated with providing comments to users, retrieve the trust score of the user from the user profile, generate or adjust a removal score of the comment based on the retrieved trust score of the user, provide an indication, to the removal component, to delete the comment without review by a human operator, if the removal score of the comment is greater than a removal threshold, and generate an abuse record and provide the abuse record to the abuse report review queue, if the removal score of the comment is less than or equal to the removal threshold; where the removal component may receive an indication to delete the comment and delete the comment in response to receiving the indication; where the abuse report review queue may receive the abuse record and provide the abuse record to the manual review interface; and where the manual review interface may provide the abuse report to a human operator and to receive an indication whether the abuse report is valid.

According to yet another aspect, one or more memory devices, that include instructions executable by one or more processors, may include one or more instructions to receive an abuse report from a user, where the abuse report indicates that a comment, associated with a document, or associated with a content of the document, violates a policy associated with providing comments to users; one or more instructions to retrieve a trust score of the user, where the trust score is based on a difference between a quantity of valid abuse reports previously submitted by the user and a quantity of invalid abuse reports previously submitted by the user; one or more instructions to generate or adjust a removal score of the comment based on the retrieved trust score of the user; one or more instructions to determine whether the removal score of the comment is greater than a removal threshold; one or more instructions to delete the comment without input from a human operator if the removal score of the comment is greater than a removal threshold; one or more instructions to determine whether the removal score of the comment is greater than a suspension threshold, if the removal score of the comment is less than or equal to the removal threshold, where the suspension threshold is less than or equal to the removal threshold; one or more instructions to temporarily suspend the comment from being provided to users, if the removal score of the comment is greater than the suspension threshold; one or more instructions to generate an abuse record for the comment and place the abuse record for the comment in an abuse report review queue, if the removal score of the comment is less than or equal to the removal threshold; one or more instructions to provide the abuse record to a human operator; one or more instructions to receive, from the human operator, an indication whether the abuse report is valid; and one or more instructions to adjust the trust score of the user based on the received indication.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

Overview

An implementation described herein may relate to ranking of users who report abuse and to responding to a report of abuse based on a rank score of the user who reported the abuse.

For some documents, users might like to see other documents that comment on the contents of these documents. These "other" documents might take various forms and will be referred to herein as "comments." A comment, also known as an annotation, may include any document (or a portion of a document) that provides an opinion of, provides additional information about, or otherwise remarks upon, the contents of another document. A comment may be identified as a comment by being stored in a particular database. Alternatively, or additionally, a comment may be identified as a comment by being labeled as a comment and being associated with a particular document, and may be available for presentation with the particular document. In other words, a user may be able to view comments in connection with the document with which the comments are associated.

A "document," as the term is used herein, is to be broadly interpreted to include any machine-readable and machine-storable work product. A document may include, for example, an e-mail, a web page or a web site, a file, a combination of files, one or more files with embedded links to other files, a news group posting, a news article, a blog, a business listing, an electronic version of printed text, a web advertisement, etc. In the context of the web (i.e., the Internet), a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Figure 1A:
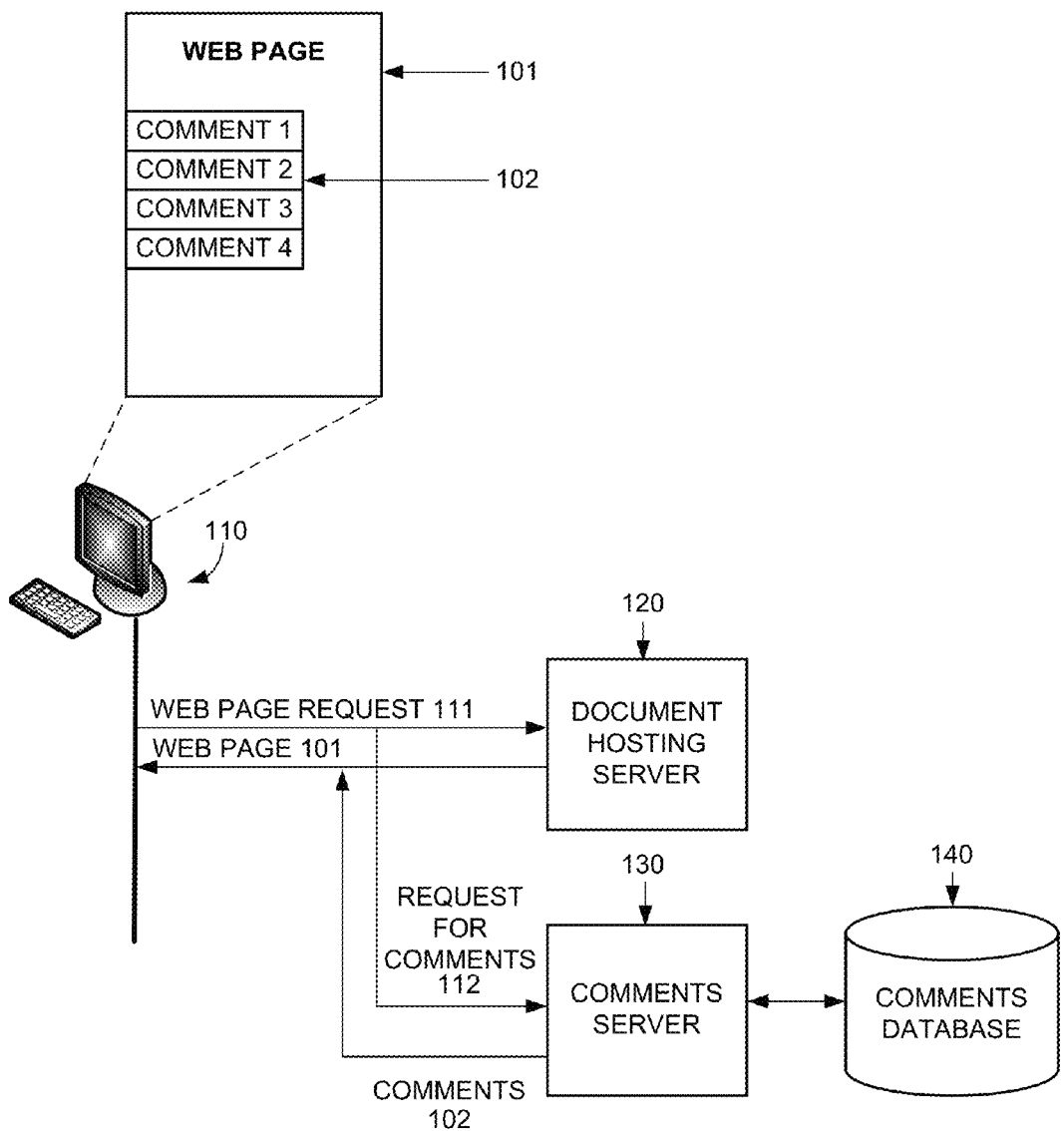
FIGS. 1A and 1B are diagrams illustrating an overview of an exemplary implementation described herein.
Figure 1B:
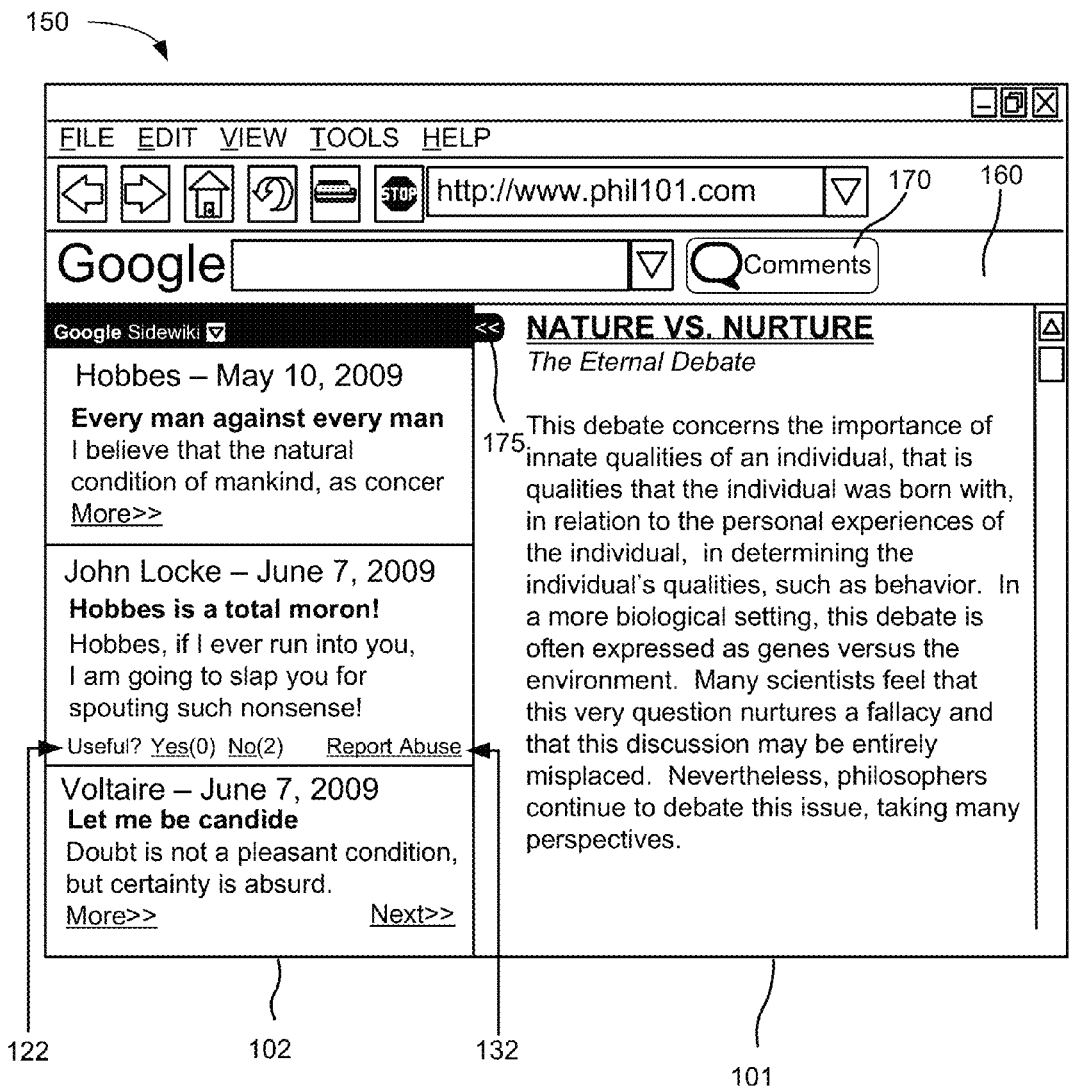

FIGS. 1A and 1B are diagrams illustrating an overview of an exemplary implementation described herein. A user may access (i.e., visit) a web page 101 by using a browser installed on client device 110. One way of creating (or modifying) comments 102 about web page 101 may include using a browser add-on application installed on the browser. However, comments may also be created (or modified) in other ways. In one implementation, the browser add-on application may include a toolbar 160 (FIG. 1B) that may be displayed in a browser window and provide one or more buttons, one or more search boxes, and/or one or more indicators (e.g. icons, message displays, etc.). One example of such a browser add-on application may include the Google Toolbar with Sidewiki. In another implementation, the browser add-on application may not include a toolbar. For example, the browser add-on application may not have any elements associated with it that are visible to a user of the browser. The browser add-on application may include a first function (e.g., a button) for creating (or modifying) comments about the document that is being displayed by the browser, and a second function for viewing comments about the document that were created by other users.

A user may request web page 101 by, for example, clicking on a link to web page 101 displayed within another document in the browser, or by typing a Uniform Resource Locator (URL) of web page 101 into an address box of the browser. In response, client device 110 may send a web page request 111 to document hosting server 120 to request web page 101. Document hosting server 120 may send web page 101 to client device 110, allowing client device 110 to display web page 101.

Additionally, client device 110 may send a request for comments 112 to comments server 130, in response to web page request 111. Comments server 130 may search comments database 140 to identify comments associated with web page 101, and may provide comments 102 to client device 110, allowing client device 110 to display comments 102 in connection with web page 101. Comments 102 may be stored in a local cache associated with the browser and may be subsequently displayed in response to a user action.

FIG. 1B illustrates browser window 150 as it may be initially displayed to the user. Browser window 150 may include web page 101, toolbar 160, and comments button 170. A user may view comments 102 by clicking on comments button 170, and may cause comments 102 to cease being displayed by clicking secondary comments button 175. Comments 102 may include one or more comments that were created about the content of web page 101. Individual comments may not always be displayed in their entirety. Rather, only the name of the author of a comment, the date the comment was created or modified, a subject line, and the first one or two lines of a comment may be displayed, allowing more comments to be displayed at one time. If a user desires to see a full comment, the user may click on a "more" button.

Clicking on more button 112 may display a full comment, along with rating button 122 and report abuse button 132. Rating button 122 may allow a user to rate a comment, and report abuse button 132 may allow a user to report a comment as abusive.

Although FIG. 1B shows exemplary components of browser window 150, in other implementations, browser window 150 may contain fewer components, different components, additional components, or differently arranged components than depicted in FIG. 1B. Additionally or alternatively, one or more components of browser window 150 may perform one or more tasks described as being performed by one or more other components of browser window 150.

A comment may be deemed abusive if it violates provider policies. For example, a comment may be deemed abusive if the comment violates policies of the provider of the add-on application (e.g., toolbar 160) that allows users to create comments and to read other people's comments. In a particular implementation, a comment may be deemed abusive if the comment includes spam (i.e., unwanted promotional or commercial content, or posts that include keyword spamming); malware, viruses, or anything that may disrupt the comment service or harm a user's computing resources; hateful, threatening, harassing, or bullying content; content promoting unlawful or illegal activities; copyright infringement; sexually explicit material or content that serves to drive user traffic to sites that include sexually explicit material; impersonation of other users; or confidential or private information of other users.

Some types of abusive content may be automatically detected. For example, some types of spam or malware may be automatically detected using spam or malware detection algorithms, and may be automatically removed. However, other types of abusive content may be difficult to detect automatically, and comments server 130 may need to depend on users' reports of abusive content to identify such abusive content.

When a user reports an abusive comment, by clicking on report abuse button 132, the comment may be flagged as abusive and marked for manual review. An administrator may need to review the reported comment to determine whether the abuse report is valid, indicating that the reported comment violates provider policy. However, relying on manual review of abuse reports may be an expensive and slow process that depends on available human resources. Another option may include configuring the system so that when a particular number of different users (e.g., 3 users) report a comment as abusive, the comment may be automatically taken down until the comment is reviewed by a human operator. However, in this case, three colluding users may conspire to take down undesirable, yet legitimate, content. Furthermore, a well-meaning user may have a poor understanding of the provider policy and may report comments that the user deems abusive, yet that do not violate the provider policy.

An implementation described herein may avoid these concerns by assigning a trust score to each user. A trust score of a user may be based on the user's past track record. For example, the trust score of a user may be based on the difference between the number of valid reports and the number of invalid reports that the user has reported. A trust score of a user may be modified based on other scores associated with the user. For example, a user's trust score may be further based on an author score of the user, a rater score of the user, a publisher score of the user, or a certification of the user.

An implementation described herein may respond to a report of abuse based on a trust score of the reporting user and may assign a removal score to the reported comment. If the removal score of a comment is less than or equal to a suspension threshold, the comment is placed in a queue for manual evaluation without removing the comment. If the removal score of a comment is greater than the suspension threshold and less than or equal to a removal threshold, the comment may be removed temporarily and placed in a queue for manual evaluation. If the removal score of a comment is greater than the removal threshold, the comment may be automatically and permanently removed, without subsequent manual evaluation. Furthermore, if a second user reports the same comment, the second user's trust score is used to modify the removal score of the comment. Thus, if multiple users with high trust scores report a particular abusive comment, the removal score of the reported abusive comment may rise above the removal threshold, and the reported abusive comment may be automatically removed.

While particular implementations described herein are described in the context of comments about documents, and abuse reports relating to potentially abusive comments, in other implementations, a trust score for a user and a removal score may be applied to other types of content. For example, a particular implementation may relate to reviews written by users about businesses, reviews written by users about products, reviews written by users about applications for a mobile communication device, or web pages that violate a web page provider policy.

Exemplary System

Figure 2:
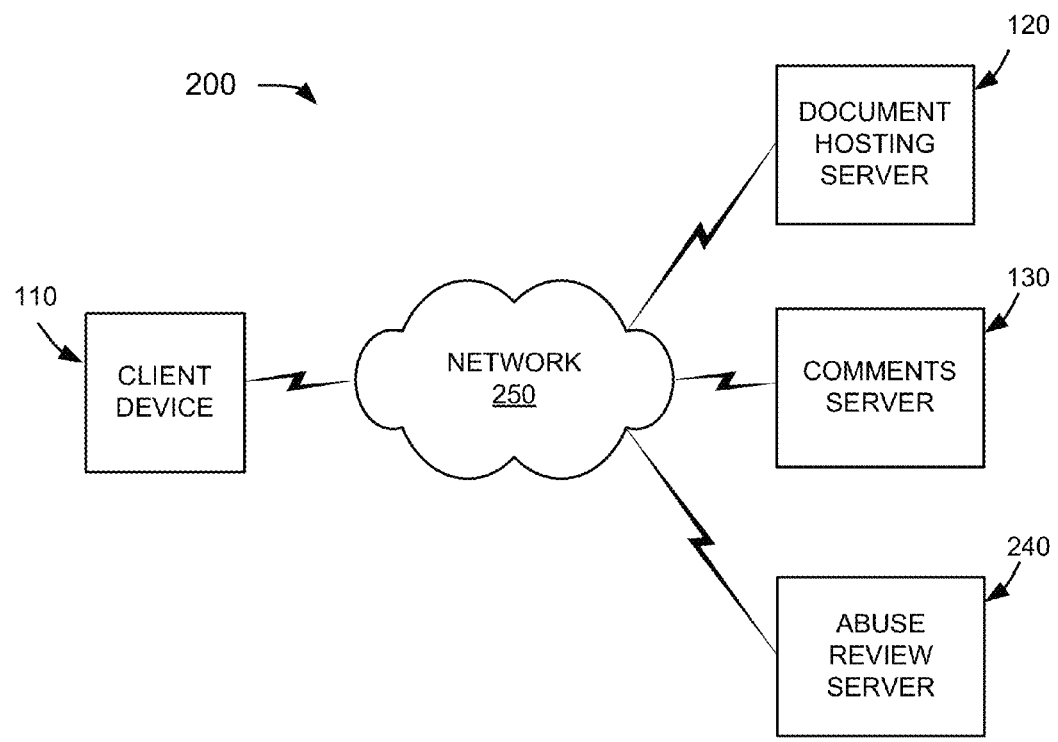
FIG. 2 is a diagram of an exemplary environment in which systems and methods described herein may be implemented.

FIG. 2 is a diagram of an exemplary system 200 in which systems and/or methods described herein may be implemented. System 200 may include client device 110, network 210, document hosting server 120, comments server 130, and an abuse review server 240.

Client device 110 may include a communication or computation device, such as a personal computer, a wireless telephone, a personal digital assistant (PDA), a lap top, or another type of computation or communication device. In one implementation, a client device 110 may include a browser that permits documents to be searched and/or accessed. Client device 110 may also include software, such as a plug-in, an applet, a dynamic link library (DLL), or another executable object or process, that may operate in conjunction with (or be integrated into) the browser to obtain and display comments. Client device 110 may obtain the software from document hosting server 120, comments server 130, or from a third party, such as a third party server, disk, tape, network, CD-ROM, etc. Alternatively, the software may be pre-installed on client device 110. For the description to follow, the software will be described as integrated into the browser.

Document hosting server 120 may include one or more server devices that host document content, such as web page 101. Comments server 130 may include one or more server devices that gather, process, search, and/or maintain documents in a manner described herein. In one implementation, comments server 130 may gather, process, and/or maintain comments that are associated with particular documents. It may be possible that comments server 130 is implemented as a single server device. It may also be possible that comments server 130 is implemented as two or more separate (and possibly distributed) devices.

Abuse review server 240 may include one or more server devices that review abuse reports from users. Abuse review server 240 may receive an abuse report when a user clicks on report abuse button 132. In response to the user clicking on the report abuse button 132, the browser add-on application associated with toolbar 160 may send an abuse report to abuse review server 240. In response to receiving an abuse report, abuse review server 240 may determine how to respond to the abuse report. For example, abuse review server 240 may permanently remove the comment associated with the abuse report, may temporarily remove the comment and place the abuse report in a abuse report review queue, or may place the abuse report in the abuse report review queue without removing the comment. Furthermore, abuse review server 240 may maintain trust scores associated with users, and may use the trust scores of users in determining how to respond to an abuse report. Abuse review server 240 may be implemented as a single server device or may be implemented as two or more separate (and possibly distributed) server devices. In a particular implementation, some or all of the functions of abuse review server 240 may be implemented by comments server 130.

Network 250 may include any type of network, such as a local area network (LAN), a wide area network (WAN), a metropolitan area network (MAN), a wireless network, such as a general packet radio service (GPRS) network, an ad hoc network, a telephone network (e.g., the Public Switched Telephone Network (PSTN) or a cellular network), an intranet, the Internet, or a combination of networks. Client device 110, document hosting server 120, comments server 130, and abuse review server 240 may connect to network 250 via wired and/or wireless connections.

Although FIG. 2 shows exemplary components of system 200, in other implementations, system 200 may contain fewer components, different components, additional components, or differently arranged components than depicted in FIG. 2. Additionally or alternatively, one or more components of system 200 may perform one or more tasks described as being performed by one or more other components of system 200.

Exemplary Devices

Figure 3:
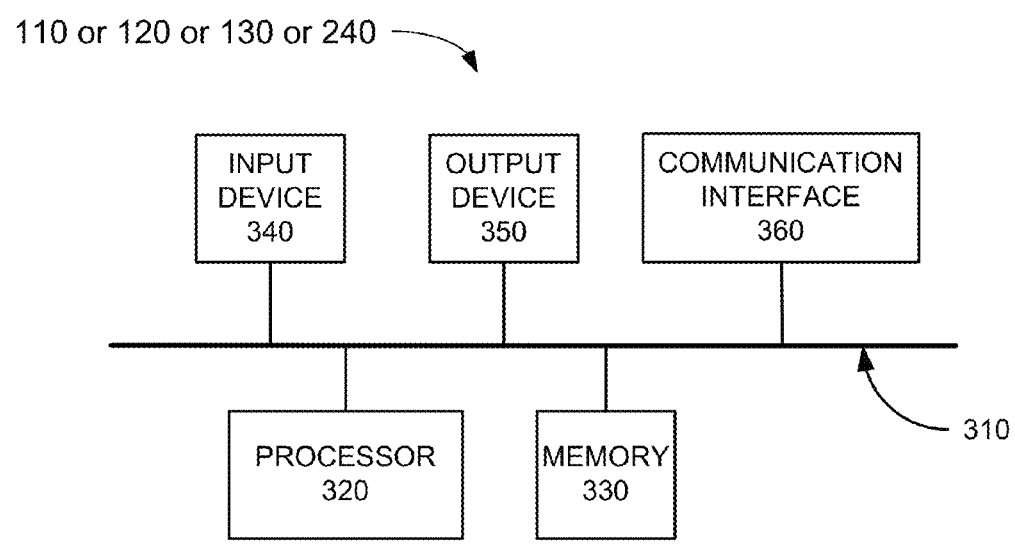
FIG. 3 is a diagram of exemplary components of a client device or a server device of FIG. 2.

FIG. 3 is a diagram of exemplary components of a client or server device (hereinafter called "client/server device"), which may correspond to one or more of client device 110, document hosting server 120, comments server 130, or abuse review server 240. The client/server device may include a bus 310, a processor 320, a memory 330, an input device 340, an output device 350, and a communication interface 360.

Bus 310 may include a path that permits communication among the components of the client/server device. Processor 320 may include a processor, a microprocessor, or processing logic (e.g., an application specific integrated circuit (ASIC) or a field programmable gate array (FPGA)) that may interpret and execute instructions. Memory 330 may include a random access memory (RAM) device or another type of dynamic storage device that may store information and instructions for execution by processor 320, a read only memory (ROM) device or another type of static storage device that may store static information and instructions for use by processor 320, a magnetic and/or optical recording memory device and its corresponding drive, and/or a removable form of memory, such as a flash memory.

Input device 340 may include a mechanism that permits an operator to input information to the client/server device, such as a keyboard, a mouse, a button, a pen, a touch screen, voice recognition and/or biometric mechanisms, etc. Output device 350 may include a mechanism that outputs information to the operator, including a display, a light emitting diode (LED), a speaker, etc. Communication interface 360 may include any transceiver-like mechanism that enables the client/server device to communicate with other devices and/or systems. For example, communication interface 360 may include mechanisms for communicating with another device or system via a network, such as network 250. For example, communication interface 360 may include a modem, a network interface card, or a wireless interface card.

As will be described in detail below, the client/server device may perform certain operations relating to the processing of comments. The client/server device may perform these operations in response to processor 320 executing software instructions contained in a computer-readable medium, such as memory 330. A computer-readable medium may be defined as one or more logical or physical memory devices. A logical memory device may include space within a single physical memory device or spread across multiple physical memory devices.

The software instructions may be read into memory 330 from another computer-readable medium, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of client device 110, document hosting server 120, comments server 130, or abuse review server 240, in other implementations, client device 110, document hosting server 120, comments server 130, or abuse review server 240 may contain fewer components, different components, additional components, or differently arranged components than depicted in FIG. 3. Additionally or alternatively, one or more components of client device 110, document hosting server 120, comments server 130, or abuse review server 240 may perform one or more tasks described as being performed by one or more other components of client device 110, document hosting server 120, comments server 130, or abuse review server 240.

Figure 4:
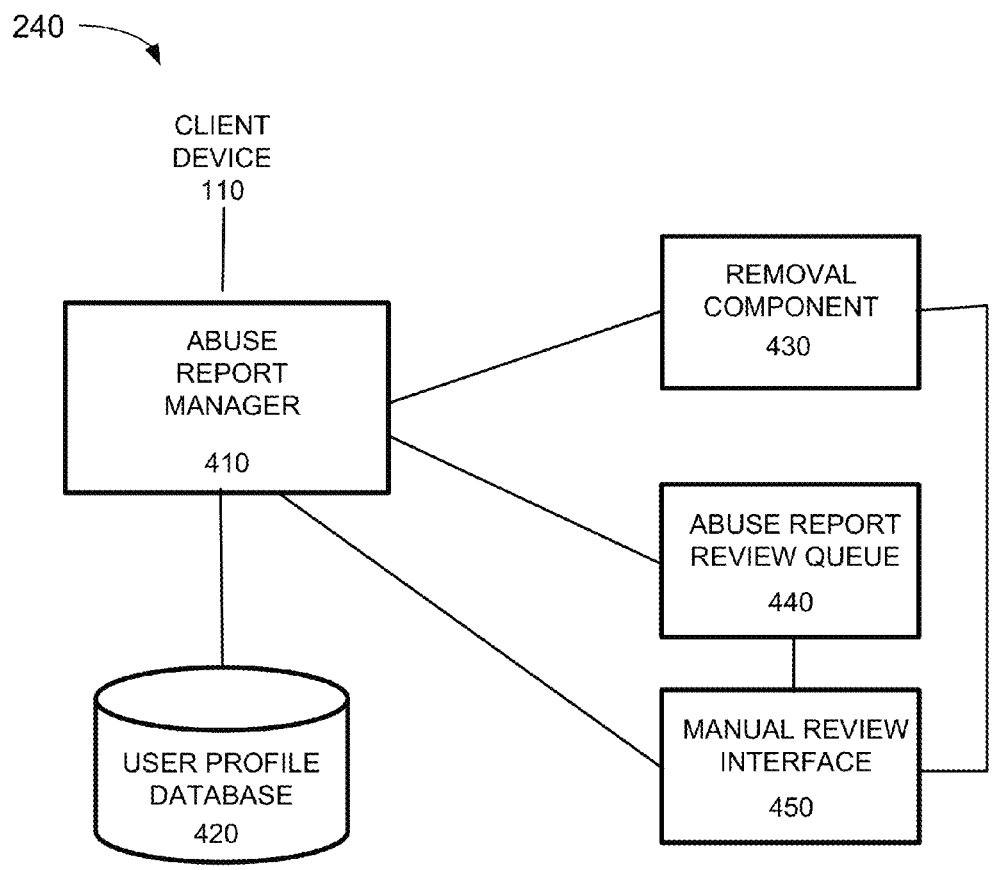
FIG. 4 is a diagram of exemplary functional components of the abuse review server of FIG. 2.

FIG. 4 is a diagram of exemplary functional components of abuse review server 240. Abuse review server 240 may include an abuse report manager 410, a user profile database 420, a removal component 430, an abuse report review queue 440, and a manual review interface 450.

Abuse report manager 410 may receive an abuse report from client device 110, reporting a particular comment as abusive, and may act on the received abuse report. Abuse report manager 410 may access user profile database 420 to retrieve information associated with the user. For example, abuse report manager 410 may retrieve a trust score associated with the user that originated the abuse report. Abuse report manager 410 may determine a removal score for the comment based on the retrieved trust score, and may determine how to act on the abuse report based on the determined removal score. If the removal score is less than or equal to a suspension threshold, abuse report manager 410 may create an abuse record for the comment and place the comment in abuse report review queue 440 without removing the comment from being available for presentation to users. If the removal score is greater than the suspension threshold but less than or equal to a removal threshold, abuse report manager 410 may label the comment for temporary removal and provide the comment to removal component 430, and create an abuse record for the comment and place the comment in abuse report review queue 440. If the removal score is greater than the removal threshold, abuse report manager 410 may label the comment for permanent removal and provide the comment to removal component 430.

Abuse report manager 410 may also determine whether other abuse reports about the reported comment have been received. For example, abuse report manager 410 may access abuse report review queue 440 to determine whether an abuse record associated with the comment is in the queue. If an abuse record about the comment is in the queue, abuse report manager 410 may add the received abuse report to the abuse record and may adjust a removal score of the comment based on the retrieved trust score of the user. The adjusted removal score may be used by the abuse report manager 410 to reassess how to act on the comment. For example, the adjusted removal score may be greater than the removal threshold, and the abuse record may be removed from the queue, the comment may be labeled for permanent removal and provided to removal component 430. Additionally, abuse report manager 410 may increase a user's trust score based on labeling a comment for permanent removal as a result of other user's reports.

User profile database 420 may store information about users. For example, user profile database 420 may store information associated with users that is used to determine how to act on an abuse report, such as a trust score of the user and other parameters that may affect the trust score, such as an author score of the user (e.g., based on ratings of comments, authored by the user, or a quantity of times comments, authored by the user, were accessed by other users), a rater score of the user (e.g., based on how often the user rates comments in the same way as a majority of users that rated the comment), a publisher score of the user (e.g., based on rank scores of documents associated with the user or how many times documents associated with the user were accessed by other users), or a certification of the user (e.g., an indication of the user's knowledge of policies associated with providing comments to users). In one implementation, user profile database 420 may be associated with comments server 130 and may include other information, associated with a user, relating to comments, such as what languages the user understands, the user's interests, a geographic location associated with the user, etc. In another implementation, user profile database 420 may be associated with abuse review server 240. In yet another implementation, information about a user, such a user's trust score, may be stored locally, on client device 110, such as in a memory structure associated with the browser add-on application (e.g., toolbar 160).

Removal component 430 may remove comments. For example, removal component 430 may send an instruction to comments server 130 to remove a particular comment and, in response, comments server 130 may remove the particular comment from comments database 140. Removal component 430 may remove comments permanently or temporarily. Removal component 430 may receive an abuse record from abuse report manager 410. The abuse record may include an indication as to whether a comment is to be removed temporarily or permanently. If a comment is to be removed permanently, removal component 430 may send an instruction to comments server 130 to delete the comment, if abuse review server 240 is implemented separately from comments server 130, or may delete the comment, if abuse review server 240 is implemented in comments server 130. If a comment is to be removed temporarily, removal component 430 may send an instruction to comments server 130 to suspend providing the comment to client device 110, until a decision is received from manual review interface 450, if abuse review server 240 is implemented separately from comments server 130, or may suspend the comment from being provided, until a decision is received from manual review interface 450, if abuse review server 240 is implemented in comments server 130.

Abuse report review queue 440 may store abuse records associated with comments for which abuse reports have been received. Abuse report review queue 440 may provide the abuse records to manual review interface 450 for review, such as in the order in which the reports have been received.

Manual review interface 460 may include an interface to review abuse reports associated with comments. Manual review interface 460 may receive input from human operators who review abuse reports and make decisions about whether particular comments should be removed. If manual review interface 460 receives input that a comment should be deleted, manual review interface 460 may provide this information to removal component 430 to delete the comment. If manual review interface 460 receives input that a comment should not be deleted, manual review interface 460 may provide this information to removal component 430 to restore the comment, if the comment has been removed temporarily.

Additionally, manual review interface 460 (or abuse report manager 410) may adjust trust scores of all users that provided abuse reports about the comment. If the comment is to be removed, and thus the abuse reports are deemed valid, trusts scores of all users that provided abuse reports about the comment may be increased. If the comment is not to be removed, and thus the abuse reports are deemed invalid, trusts scores of all users that provided abuse reports about the comment may be decreased.

Although FIG. 4 shows exemplary functional components of abuse review server 240, in other implementations, abuse review server 240 may contain fewer functional components, different functional components, additional functional components, or differently arranged functional components than depicted in FIG. 4. Additionally or alternatively, one or more components of abuse review server 240 may perform one or more tasks described as being performed by one or more other components of abuse review server 240.

Figure 5:
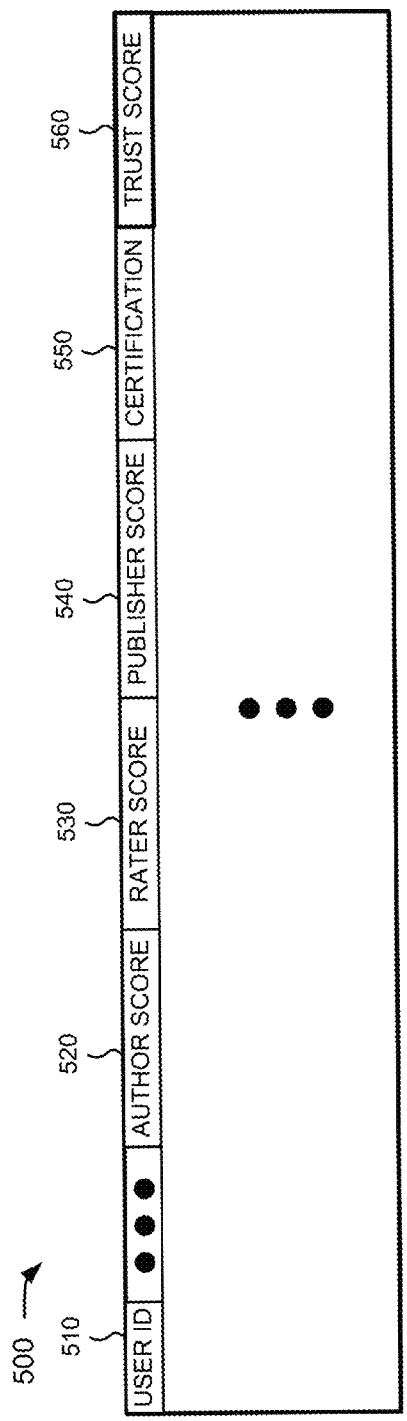
FIG. 5 is a diagram of exemplary data fields of a user profile record that may be stored in the user profile database of FIG. 4.

FIG. 5 is a diagram of exemplary data fields of a user profile record 500 that may be stored in user profile database 420 of FIG. 4. User profile record 500 may include a user identification (ID) field 510, an author score field 520, a rater score field 530, a publisher score field 540, a certification field 550, and a trust score field 560.

User ID field 510 may store information that identifies a particular user. In one implementation, user ID field 510 may not include any information that may be used to determine a user's identify. For example, user ID field 510 may include a string that may be matched to a string, identifying a user, included in an abuse report received from client device 110.

Author score field 520 may store a score that measures a reputation of the user as an author. For example, author score field 520 may store a score that measures the user's reputation as an author of comments. The author score may be based on ratings of the user's comments. For example, if another user rates a comment, written by the user, as useful, the user's author score may be increased. Additionally or alternatively, the author score may be based on a number of times other users have read the user's comments. In one implementation, this may be measured by a number of times that other users have clicked on "more" button 112 associated with the user's authored comments.

Additionally or alternatively, the author score may be associated with a reputation of the user as an author of other content, such as, for example, a reputation of the user as a writer of product reviews, a writer of updates on a social web site, a blog web site, or a microblogging web site, or a writer of news articles. The author score associated with other content may be based on ratings of the user's authored content by other users and/or based on a number of times other users have accessed the user's authored content. The author score may be determined, for example, by comments server 130.

Rater score field 530 may store a score that measures a reputation of the user as a rater. For example, rater score field 530 may store a score that measures the user's reputation as a rater of comments. A user may be considered to have a high reputation as a rater if the user tends to vote with the community. For example, the rater score may be computed based on a percentage of time that the user's rating of a comment agrees with a majority of users that have rated the comment. As another example, a user's score as a rater may be decreased if the user tends to rate comments positively or negative a disproportionate percentage of time. Thus, if a user rates comments negatively more than a threshold percentage of times (e.g., four out of five times), the user's rater score may be decreased. The rater score may be determined, for example, by comments server 130.

Publisher score field 540 may store a score that measures a reputation of the user as a publisher of content. Content published by the user may or may not include content authored by the user. For example, the publisher score may be based on web sites associated with the user. Thus, if a user writes a blog that is accessed by a large number of users (e.g., more than a threshold number of users per day), or if the user owns a web site that consistently ranks high in a search engine (e.g., has a rank score greater than a particular threshold), the user's publisher score may be increased. The publisher score may be determined, for example, by comments server 130.

Certification field 550 may store certifications obtained by the user that may be relevant to the user's knowledge of policy associated with comments. For example, a user may take a test to determine the user's knowledge of policy associated with abusive comments. If the user passes the test, it may demonstrate a good knowledge of policies regarding what is considered an abusive comment, and the user may be considered a trustworthy user. As another example, a user may be an administrator associated with toolbar 160, or a user may be a designated manual reviewer of abuse reports. The certification may be determined, for example, by abuse review server 240.

Trust score field 560 may store a trust score that measures how trustworthy a user is considered by abuse review server 240. The trust score may be based on a difference between a number of valid abuse reports that a user has submitted and a number of invalid abuse reports that the user has submitted. Trust score field 560 may store a trust score as well as the number of valid abuse reports and the number of invalid abuse reports that have been generated by the user. Storing the number of valid and invalid abuse reports may be necessary to adjust the trust score when future abuse reports are generated by the user. Additionally, a trust score of a user may be adjusted based on the information in user's author score field 520, rater score field 530, publisher score field 540, and certification field 550.

Although FIG. 5 shows exemplary fields of user profile record 500, in other implementations, user profile record 500 may contain fewer fields, different fields, additional fields, or differently arranged fields than depicted in FIG. 5. Additionally or alternatively, one or more fields of user profile record 500 may include information described as being included in one or more other fields of user profile record 500.

Figure 6:
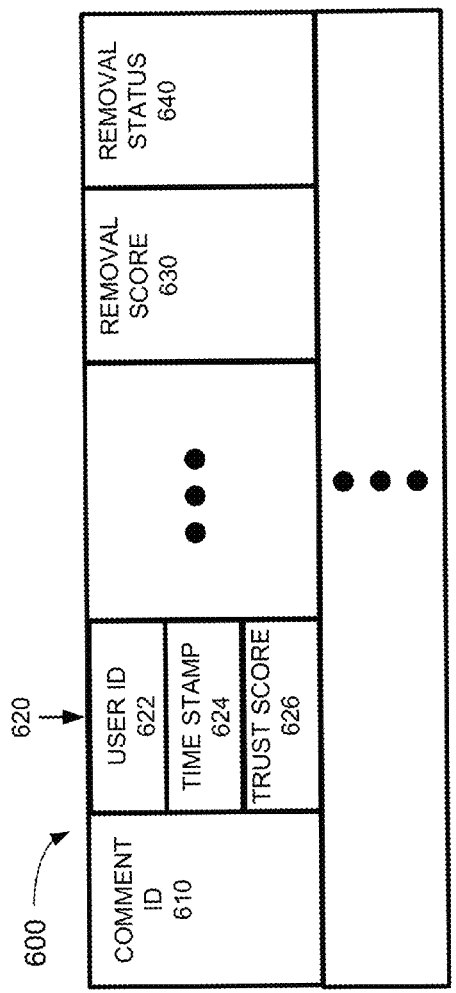
FIG. 6 is a diagram of exemplary data fields of an abuse report record that may be stored in the abuse report review queue of FIG. 4.

FIG. 6 is a diagram of exemplary data fields of an abuse report record 600 that may be stored in abuse report review queue 440 of FIG. 4. Abuse report record 600 may include a comment ID field 610, one or more abuse report fields 620, a removal score field 630, and a removal status field 640.

Comment ID field 610 may store a string that uniquely identifies a particular comment.

Abuse report record 600 may include one or more abuse report fields 620. A new abuse report field 620 may be added to abuse report record 600 each time a new abuse report is received from a particular user for the comment identified in comment ID field 610. Abuse report field 620 may include user ID field 622, a time stamp field 624, and trust score field 626.

User ID field 622 may store information that identifies a particular user. For example, user ID field 622 may store a string, identifying a particular user, which was received with an abuse report from client device 110. Time stamp field 624 may store the date and/or time that an abuse report was generated. The date/time for time stamp field 624 may be generated by client 110 or may be generated by abuse review server 240 based on a date/time at which the abuse report was received. Trust score 626 may store a trust score which was retrieved from user profile record 500 associated with user ID field 622.

Removal score field 630 may store a removal score that may be used to determine whether the comment identified in comment ID field 610 should be removed. For example, if the score stored in removal score field 630 is greater than a particular threshold, the comment may be removed. The removal score may be adjusted each time a new abuse report is received, based on the trust score of the user who generated the abuse report.

Removal status field 640 may store a status of the comment identified in comment ID field 610. For example, removal status field 640 may store information about whether a comment is labeled as active, temporarily removed, or permanently removed. A comment marked for permanent removal may be removed from abuse report review queue 440 and provided to removal component 430 for deletion.

Although FIG. 6 shows exemplary fields of abuse report record 600, in other implementations, abuse report record 600 may contain fewer fields, different fields, additional fields, or differently arranged fields than depicted in FIG. 6. Additionally or alternatively, one or more fields of abuse report record 600 may include information described as being included in one or more other fields of abuse report record 600.

Figure 7A:
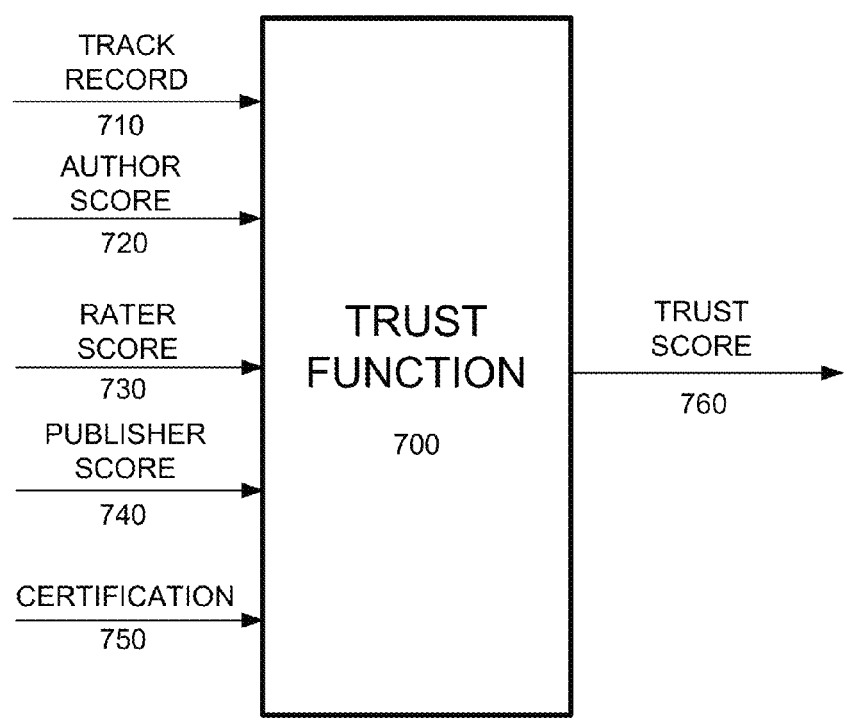
FIG. 7A is a diagram of an exemplary function for generating a trust score for a user.

FIG. 7A is a diagram of an exemplary trust function 700 for generating a trust score for a user. Trust function 700 may, for a particular user, take as input values for one or more of the depicted parameters and generate a trust score 760.

In one implementation, trust function 700 may be implemented by comments server 130 or by abuse review server 240. In another implementation, trust function 700 may be implemented by the comments add-on application (e.g., toolbar 160) of client device 110.

Trust function 700 may include a track record input 710 associated with a user. Track record input 710 may include a difference between a number of abuse reports generated by a user that were deemed valid and a number of abuse reports generated by a user that were deemed invalid. A benefit of using the difference between the number of abuse reports generated by a user that were deemed valid and the number of abuse reports generated by a user that were deemed invalid as an input to trust function 700 may include identifying users that have demonstrated good judgment in identifying abusive comments.

Trust function 700 may include an author score input 720 associated with a user. Author score input 720 may include an author score retrieved from author score field 520 of user profile 500 associated with a user. A benefit of using an author score as an input to trust function 700 may include identifying users that have developed a good reputation as authors. Users with a good reputation as authors may be more reliable members of the user community, and may thus be more trustworthy in identifying abusive comments.

Trust function 700 may include a rater score input 730 associated with a user. Rater score input 730 may include a rater score retrieved from rater score field 530 of user profile 500 associated with a user. A benefit of using a rater score as an input to trust function 700 may include identifying users that have demonstrated a reputation as raters. Users with a good reputation as raters may be in tune with the mindset of the user community, and may thus be more trustworthy in identifying comments that may appear abusive to the user community.

Trust function 700 may include a publisher score input 740 associated with a user. Publisher score input 740 may include a publisher score retrieved from publisher score field 540 of user profile 500 associated with a user. A benefit of using a publisher score as an input to trust function 700 may include identifying users that have developed a good reputation as publishers of content. Users with a good reputation as publishers of content may be more reliable members of the user community, and may thus be more trustworthy in identifying abusive comments.

Trust function 700 may include a certification input 750 associated with a user. Certification input 750 may include an indication as to whether user profile 500 associated with a user includes a certification in certification field 550. A benefit of using a certification as an input to trust function 700 may include identifying users that have demonstrated knowledge of policies regarding comments. Users with a certification may thus be relied upon to correctly identify comments that violate a policy.

Inputs of trust function 700 may be combined to generate trust score 760 for a user. In one implementation, inputs of trust function 700 may be combined as a weighted sum. In other words, each of the inputs of trust function 700 may be multiplied by a weight and the results may be added to generate trust score 760. For example, track record input 710 may be given a greater weight than the other inputs, and thus trust score 760 may depend most significantly on track record input 710. In another implementation, author score input 720, rater score input 730, and publisher score input 740 may not influence trust score 760 unless the values are greater than particular thresholds. For example, an author score of a user may not influence the user's trust score 760, unless the author score of the user is greater than a particular threshold, and/or lower than a particular threshold.

Although FIG. 7A shows exemplary inputs of trust function 700, in other implementations, trust function 700 may contain fewer inputs, different inputs, or additional inputs, than depicted in FIG. 7A. Additionally or alternatively, one or more inputs of trust function 700 may include information described as being included in one or more other inputs of trust function 700.

Figure 7B:
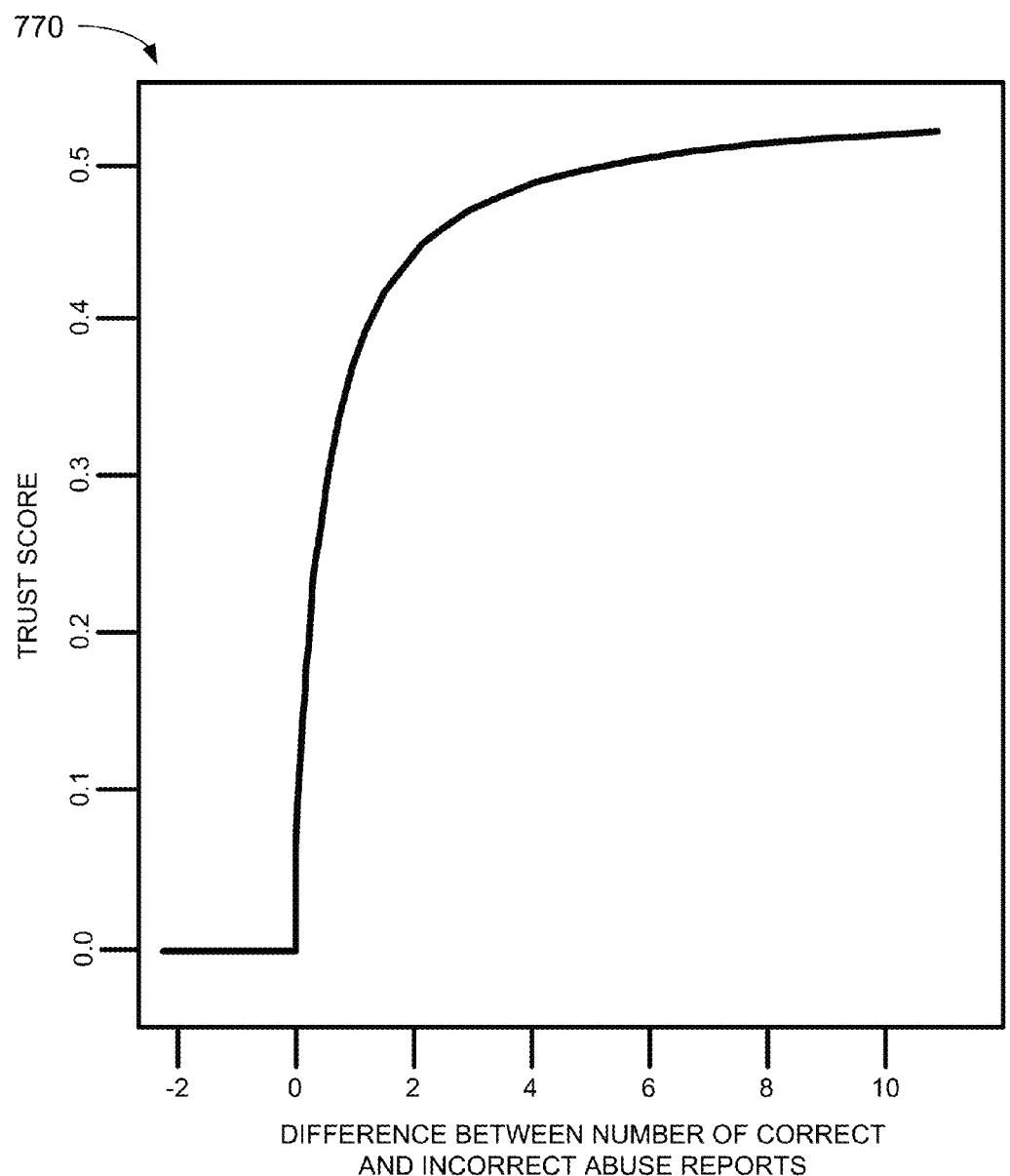
FIG. 7B is a diagram of an exemplary plot of a trust score function.

FIG. 7B is a diagram of an exemplary trust function plot 770 of a trust score function according to an implementation described herein. In a particular implementation, trust score 760 may be a value in the [0,1] range, and when multiple users report abuse, the trust value associated with each user is added to the removal score associated with a comment. When the removal score reaches a value of 1, the associated comment is labeled for permanent removal. Trust score 760, for a particular user, may be based on a difference between a number of times the user's report agreed with a manual reviewer and the number of times the user's report disagreed with the manual reviewer:

$$\Delta R = R_{CORRECT} - R_{INCORRECT} \quad (1)$$

Trust function 700 may be represented as:

$$T(\Delta R) = H(P(\Delta R) - h) \quad (2)$$

In Equation (2), H represents the unit step function, P represents the logistic function, and h represents an empirically chosen constant. A unit step function may return a value of 0 for a negative argument and a value of 1 for a positive argument. A logistic function may correspond to $$P(t) = \frac{1}{1+e^t}.$$

In a particular implementation, empirically chosen constant h may be set to 0.45.

As shown in FIG. 7B, trust function plot 770, when based on Equation (2), may assign a trust score of 0 to a user that provided more incorrect reports than correct reports. As the number of correct reports rises, the trust score may rise in a sigmoid manner corresponding to a logistic function, rising rapidly and tapering off asymptotically to a particular score, in this case to a trust score of 0.5. Thus, in the implementation depicted in FIG. 7B, based on a user's track record, a user may achieve a maximum trust score of 0.5. Therefore, a minimum of two users with high trust scores may be required to increase the removal score of a comment to a value of 1, prompting removal of the comment.

Exemplary Processes

Figure 8:
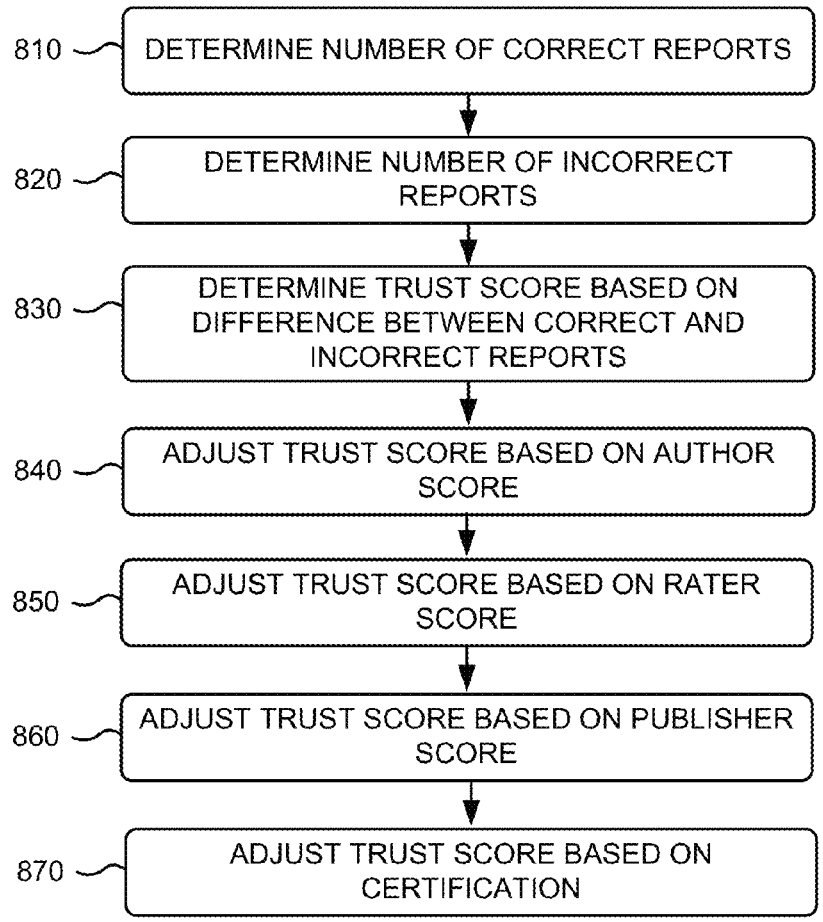
FIG. 8 is a flowchart of an exemplary process for determining a trust score for a user according to an implementation described herein.

FIG. 8 is a flowchart of an exemplary process for determining a trust score for a user according to an implementation described herein. In one implementation, the process of FIG. 8 may be performed by abuse review server 240. In other implementations, some or all of the process of FIG. 8 may be performed by another device or a group of devices separate from or including abuse review device 240.

The process of FIG. 8 may include determining a number of correct abuse reports made by a user (block 810). For example, abuse report manager 410 may determine the number of correct abuse reports generated by a user, by keeping track of each time a comment that the user reported is labeled for permanent removal based on the removal score of the comment reaching a threshold, and/or by keeping track each time that a reviewer decides that an abuse report generated by the user is valid, and labels the comment for permanent removal.

A number of incorrect abuse reports made by the user may be determined (block 820). For example, abuse report manager 410 may determine the number of incorrect abuse reports generated by a user, by keeping track of each time a reviewer decides that an abuse report generated by the user is invalid.

A trust score for the user may be determined based on a difference between the number of correct and incorrect abuse reports made by the user (block 830). For example, abuse report manager 410 may calculate the difference between the number of correct and incorrect abuse reports using, for example, Equation (2).

The trust score may be adjusted based on an author score associated with the user (block 840). For example, abuse report manager 410 may retrieve the author score associated with the user from author score field 520 and adjust the trust score stored in trust score field 560 based on the retrieved author score. In one implementation, the author score of the user may be used to adjust the trust score of the user regardless of the value of the author score. In another implementation, the author score of the user may be used to increase the trust score only if the author score is greater than a particular author score threshold. In such an implementation, the author score of the user affects the trust score of the user only if the user has achieved a particular level of reputation as an author (as set by the author score threshold). Additionally or alternatively, a second author score threshold may be set for low author scores. If a user's author score is less than or equal to the second author score threshold, indicating that the user is considered a particularly poor author of comments by other users, the user's trust score may be decreased. If a user's author score changes, for example by having other users rate the user's authored comments as useful, abuse report manager 410 may adjust the trust score of the user accordingly.

The trust score may be adjusted based on a rater score associated with the user (block 850). For example, abuse report manager 410 may retrieve the rater score associated with the user from rater score field 530 and adjust the trust score stored in trust score field 560 based on the retrieved rater score. In one implementation, the rater score of the user may be used to adjust the trust score of the user regardless of the value of the rater score. In another implementation, the rater score of the user may be used to adjust the trust score only if the rater score is greater than a particular rater score threshold. In such an implementation, the rater score of the user affects the trust score of the user only if the user has been determined to be a reliable rater (as set by the rater score threshold). Additionally or alternatively, a second rater score threshold may be set for low rater scores. If a user's rater score is less than or equal to the second rater score threshold, indicating that the user is considered a particularly poor rater of comments, the user's trust score may be decreased. If a user's rater score changes, for example by calculating that the user tends to vote with the community more often than in the past, abuse report manager 410 may adjust the trust score of the user accordingly.

The trust score may be adjusted based on a publisher score associated with the user (block 860). For example, abuse report manager 410 may retrieve the publisher score associated with the user from publisher score field 540 and adjust the trust score stored in trust score field 560 based on the retrieved publisher score. In one implementation, the publisher score of the user may be used to adjust the trust score of the user regardless of the value of the publisher score. In another implementation, the publisher score of the user may be used to adjust the trust score only if the publisher score is greater than a particular publisher score threshold. In such an implementation, the publisher score of the user affects the trust score of the user only if the user has been determined to be associated with a published web site that is considered to be of a particular level of quality or a particular level of popularity. If a user's popularity score changes, for example by determining that a web site associated with the user has increased in rank or has increased in the number of times the web site is accessed, abuse report manager 410 may adjust the trust score of the user accordingly.

The trust score may be adjusted based on a certification associated with the user (block 870). For example, abuse report manager 410 may access certification field 550 associated with the user to determine whether the user has obtained any certifications. If it is determined that the user has obtained a certification, the trust score associated with the user may be increased. The trust score may be increased based on a type of certification. For example, a first type of certification may cause the trust score to be increased by a first particular amount, while a second type of certification may cause the trust score to be increased by a second particular amount.

While blocks 840-870 of FIG. 8 are depicted in a particular order, blocks 840-870 may be performed concurrently or in a different order from the one depicted in FIG. 8.

Figure 9:
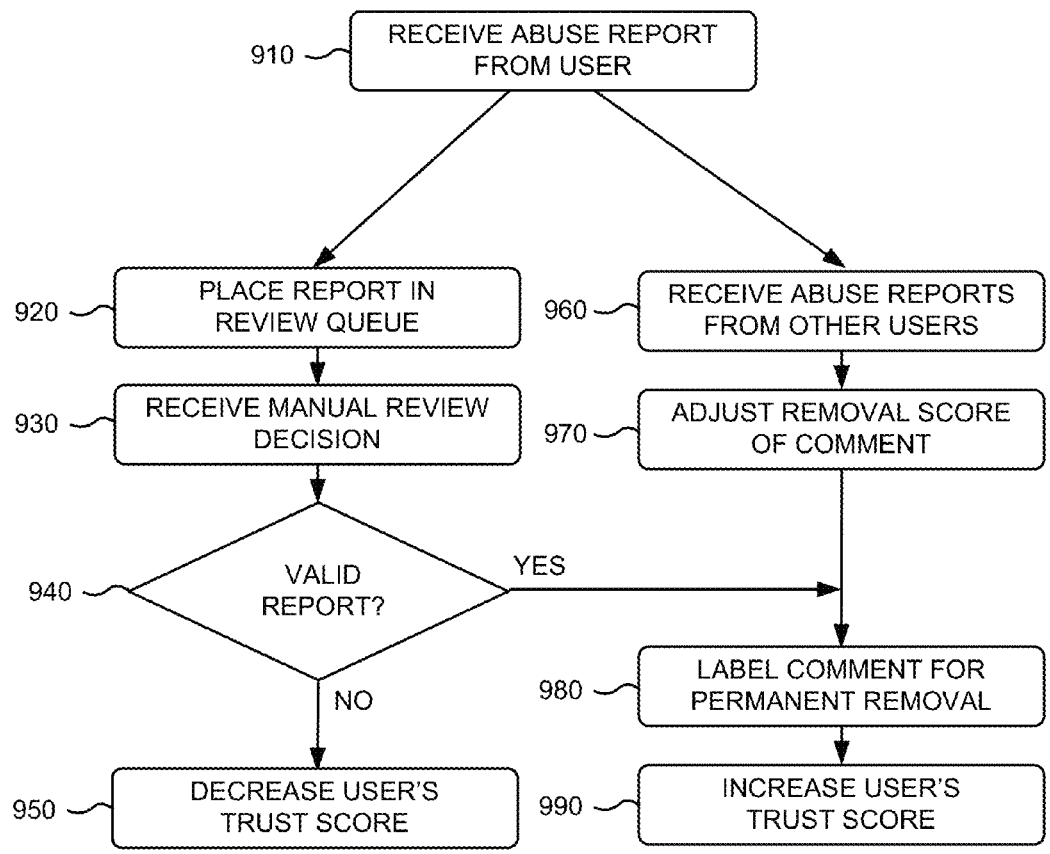
FIG. 9 is a flowchart of an exemplary process for adjusting a trust score for a user according to an implementation described herein.

FIG. 9 is a flowchart of an exemplary process for adjusting a trust score for a user according to an implementation described herein. In one implementation, the process of FIG. 9 may be performed by abuse review server 240. In other implementations, some or all of the process of FIG. 9 may be performed by another device or a group of devices separate from or including abuse review device 240.

The process of FIG. 9 may include receiving an abuse report from a user (block 910). For example, abuse review server 240 may receive an abuse report from client device 110, in response to a user of client device 110 clicking on report abuse button 132 associated with a particular comment. The abuse report may include information identifying the user, such as a unique string that may be used to locate user profile 500 associated with the user.

The received abuse report may be placed in a review queue (block 920). For example, abuse report manager 410 may determine that the trust score associated with the user that generated the abuse report is less than or equal to a suspension threshold, indicating that the user is not trusted enough by the system to automatically remove the comment. Thus, abuse report manager 410 may generate abuse record 600 and place the abuse record in abuse report review queue 440.

A manual review decision may be received for the abuse report (block 930). For example, abuse report review queue 440 may eventually provide abuse record 600 to manual review interface 450. A human operator may review the comment specified by the abuse record.

A determination may be made whether the abuse report was valid (block 940). For example, a human operator may make a decision, based on the operator's knowledge of policies defining what constitutes an abusive comment, as to whether the comment specified by the abuse record violates a policy, and thus whether the abuse report is valid.

If it is determined that the abuse report is not valid (block 940—NO), the user's trust score may be decreased (block 950). For example, the human operator may mark abuse record 600 as invalid and may delete abuse record 600, thereby keeping the reported comment active. In response, manual review interface 450 may provide information to abuse report manager 410, and abuse report manager 410 may decrease the user's trust score, based on the fact that the user provided an invalid abuse report.

If it is determined that the abuse report is valid (block 940—YES), the comment may be labeled for permanent removal (block 980). For example, the human operator may mark abuse record 600 as valid and may indicate that the reported comment should be deleted. In response, manual review interface 450 may provide information to abuse report manager 410, indicating that an abuse report generated by the user was deemed valid. The user's trust score may be increased (block 990). For example, abuse report manager 410 may increase the user's trust score, in response to receiving an indication of a valid abuse report from manual review interface 450, by accessing user profile 500 associated with the user in user profile database 420.

Alternatively or additionally, after receiving the abuse report from the user (block 910), abuse reports, for the same comment, may be received from other users (block 960). For example, abuse report manager 410 may receive abuse reports from other client devices 110, reporting the same comment. In response, abuse record 600 of the reported comment may be updated with the received abuse reports.

A removal score of the comment may be adjusted (block 970). For example, abuse report manager 410 may increase the removal score of the comment based on the trust scores of the other users that reported the comment. For example, the trust scores of all users that reported the comment may be combined (e.g., added together).

The comment may be labeled for permanent removal (block 980) and the user's trust score may be increased (block 980). For example, combining the trust scores of all of the users that reported the comment may raise the removal score of the comment above a removal threshold, and abuse report manager 410 may indicate, in removal status field 640, that the comment should be permanently removed. In response, abuse report manager 410 may increase the user's trust score, as the user's abuse report has been deemed to be valid.

Adjusting a user's trust score when an abuse report was deemed valid based on trust scores of other users that reported the comment, may appear to be subject to user collusion. For example, it may appear that multiple users may conspire to report a particular comment, because they do not like the content of the comment, even though the comment does not violate policies. If the users succeed in increasing the comment's removal score above the removal threshold, the users may be able to illegitimately remove the comment as well as illegitimately increase their own trust scores. However, this seems unlikely, because in order for the users to increase the removal score of the comment above the removal threshold, the users need to have trust scores greater than a certain value, or there needs to be a large number of users, with low trust scores, conspiring together. However, as can be seen in FIG. 7B, in order to earn even a low positive value trust score, a user may need to generate at least one valid abuse report.

Nevertheless, to avoid illegitimately adjusting a user's trust score when an abuse report is deemed valid based on trust scores of other users, in one implementation an additional safeguard may be put in place. Abuse report manager 410 may adjust the trust score of a user that reported a comment only if the trust scores of the other users that reported the comment are greater than a particular trust score threshold. Thus, abuse report manager 410 may set a high trust threshold. A first user that has a trust score greater than the high trust threshold may be trusted enough so that a second user's trust score may be increased, if the second user reports a comment that was also reported by the first user, and if the comment ends up being removed. The high trust threshold may be set sufficiently high so that only users with a very good track record may earn trust scores above the high trust threshold.

In one particular implementation, a random number generator may be used to select a number of abuse reports generated by trusted users (e.g., users with a trust score above a particular trust score threshold). The selected abuse reports may be placed in abuse report review queue 440 for manual review. Providing a random sample of abuse reports from trusted users for manual review may be used to verify that an algorithm for calculating trust scores for users is performing correctly.

Figure 10:
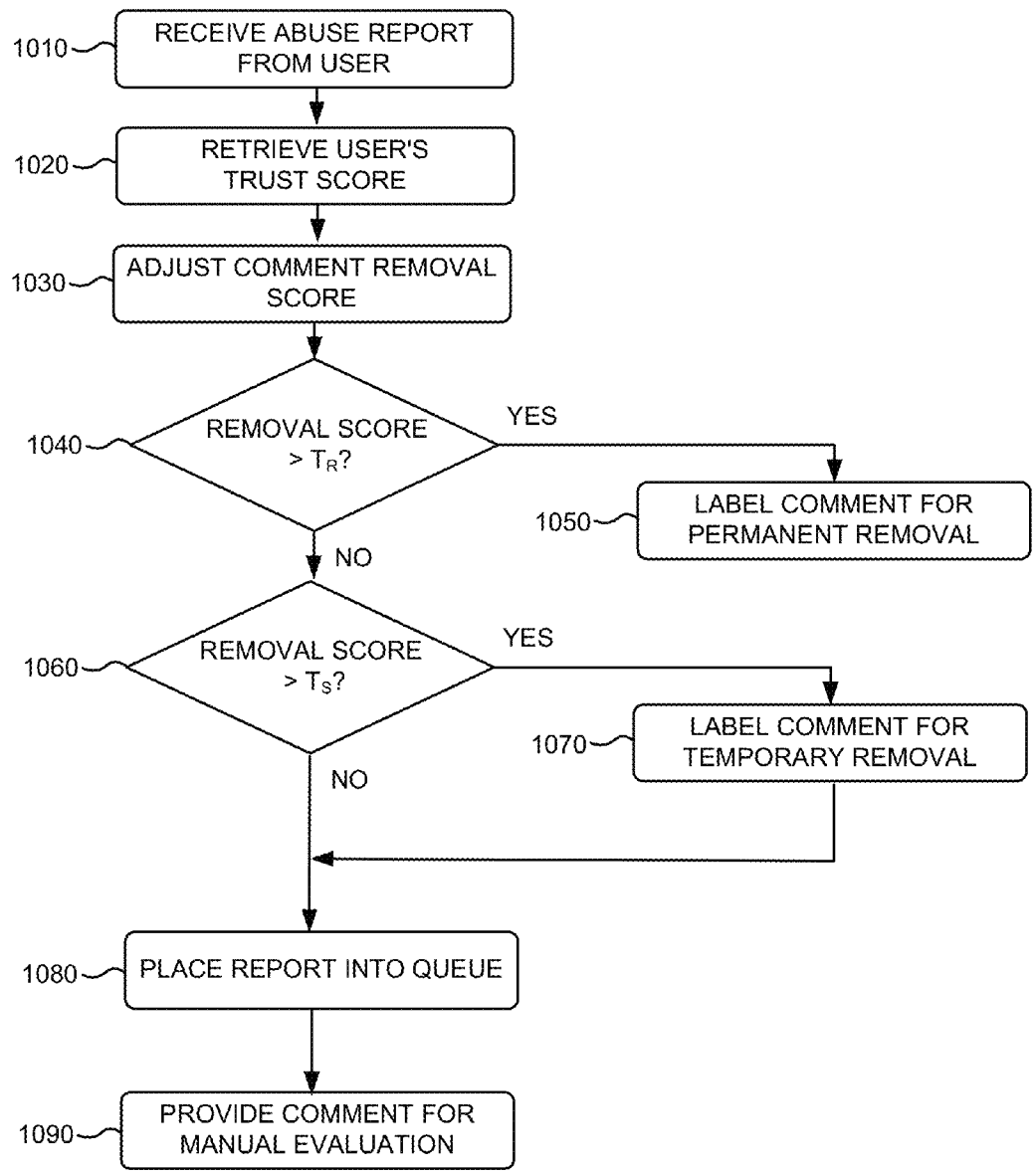
FIG. 10 is a flowchart of an exemplary process for determining how to respond to an abuse report for a comment according to an implementation described herein.

FIG. 10 is a flowchart of an exemplary process for determining how to respond to an abuse report for a comment according to an implementation described herein. In one implementation, the process of FIG. 10 may be performed by abuse review server 240. In other implementations, some or all of the process of FIG. 10 may be performed by another device or a group of devices separate from or including abuse review device 240.

The process of FIG. 10 may include receive an abuse report from a user (block 1010). For example, abuse review server 240 may receive an abuse report from client device 110, in response to a user of client device 110 clicking on report abuse button 132 associated with a particular comment. The abuse report may include information identifying the user that sent the report, which may be obtained by the browser add-on application. For example, in one implementation, user may need to create an account to activate the browser add-on application. In another implementation, the user may be assumed to be associated with a particular client device 110. In order to protect a user's privacy, the information identifying the user need not include information that may be used to determine the user's identity. Rather, the information identifying the user may include a unique string which may be associated with a user profile that stores a trust score associated with the user.

In one implementation, clicking on report abuse button 132 may send an abuse report to abuse review server 240 without further information from the user. In another implementation, a user may be prompted to identify the type of violation that the user believes is associated with the comment. For example, the user may asked to identify whether the comment includes spam; malware; hateful or threatening language; content promoting unlawful or illegal activities; copyright infringement; sexually explicit material; impersonation of other users; or confidential or private information of other users. It may be desirable to give higher priorities to some types of policy violations. For example, if a user indicates that a comment promotes illegal activities, the abuse report may be given a higher priority and may be moved to the front of a queue.

A user's trust score may be retrieved (block 1020). For example, abuse report manager 410 may identify user profile 500 associated with the user that generated the abuse report, and retrieve the trust score stored in trust score field 560 of user profile 500. A removal score, for the comment associated with the received abuse report, may be adjusted (block 1030). For example, abuse report manager 410 may check abuse report review queue 440 to determine whether abuse record 600 exists for the reported comment. If abuse record 600 exits, abuse report manager 410 may add the received abuse report to abuse record 600, and may adjust removal score 630 of abuse record 600 based on the trust score retrieved from trust score field 560 of user profile 500.

If no abuse record 600 for the reported comment exists in abuse report review queue 440, abuse report manager 410 may generate the removal score of the report comment from the trust score retrieved from trust score field 560 of user profile 500.

A determination may be made whether the removal score of the comment is greater than a removal threshold (block 1040). For example, abuse report manager 410 may compare the removal score of the comment to the removal threshold. If it is determined that the removal score of the comment is greater than the removal threshold (block 1040—YES), the comment may be labeled for permanent removal (block 1050). For example, abuse report manager 410 may change removal status field 640 of the comment to indicate permanent removal, and may send a message to removal component 430 to delete the comment. Removal component 430 may delete the comment or may send a message to comments server 130 to delete the comment.

If it is determined that the removal score of the comment is less than or equal to the removal threshold (block 1040—NO), a determination may be made whether the removal score of the comment is greater than a suspension threshold (block 1060). For example, abuse report manager 410 may compare the removal score of the comment to the suspension threshold.

If it is determined that the removal score of the comment is greater than the suspension threshold (block 1060—YES), the comment may be labeled for temporary removal (block 1070), and the abuse report may be placed in a queue (block 1080). For example, abuse report manager 410 may change removal status field 640 of the comment to indicate temporary removal (i.e., suspension of the comment), and may send a message to removal component 430 to suspend the comment. Removal component 430 may temporarily suspend the comment from being provided, or may send a message to comments server 130 to temporarily suspend the comment from being provided. Additionally, abuse report manager 410 may create abuse record 600 for the comment and place the comment in abuse report review queue 440.

If it is determined that the removal score of the comment is less than or equal to the suspension threshold (block 1060—NO), the abuse report may be placed in a queue (block 1080), without temporary removal of the comment. For example, abuse report manager 410 may create abuse record 600 for the comment and place the comment in abuse report review queue 440.

The comment may be provided for manual evaluation (block 1090). For example, abuse report review queue 440 may provide abuse record 600 of the comment to manual review interface 450, and a human operator may review the comment to determine whether the comment violates one or more policies. An indication may be received from manual review interface 450 whether the comment violates one or more policies. If the comment was not temporarily removed from being provided to users prior to abuse record 600 associated with the comment being placed in abuse report review queue 440, and the comment is deemed not to violate any policies, no action may be taken. If the comment was temporarily removed from being provided to users and the comment is deemed not to violate any policies, the comment may be restored and comments server 130 may resume providing the comment to users. If the comment is deemed to violate a policy, the comment may be deleted.

Example

Figure 11:
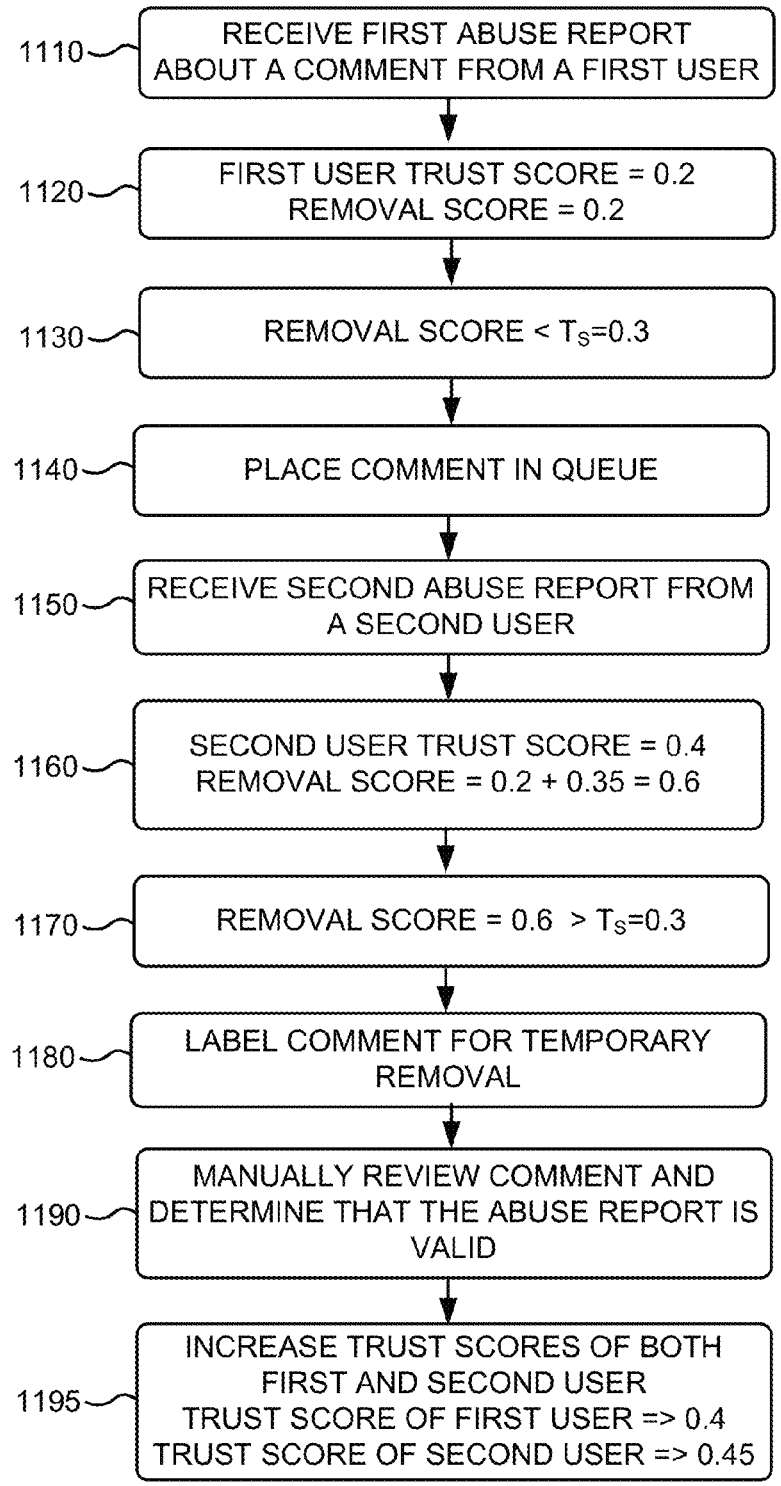
FIG. 11 is a flowchart of a process illustrating an example of receiving abuse reports for a comment according to an implementation described herein.

FIG. 11 is a flowchart of a process illustrating an example of receiving abuse reports for a comment according to an implementation described herein. In one implementation, the process of FIG. 11 may be performed by abuse review server 240. In other implementations, some or all of the process of FIG. 11 may be performed by another device or a group of devices separate from or including abuse review device 240.

A first abuse report about a comment may be received from a first user (block 1110). For example, a user may click on "Report Abuse" button 132. A removal score of the comment may be set based on the user's trust score (block 1120). Assume that the user's trust score is 0.2. The removal score of the reported comment may be set to 0.2. Further assume that the suspension threshold for temporarily removing a comment has been set to 0.3. A determination may be made that the removal score of the comment is less than or equal to a suspension threshold (block 1130), and the comment may be placed in a review queue (block 1140).

A second abuse report for the comment may be received from a second user (block 1150). Assume that the second user's trust score is 0.4. The removal score of the comment may be adjusted based on the second user's trust score (block 1160). The second user's trust score may be added to the removal score of the comment to arrive at a new removal score of 0.6. A determination may be made that the removal score of the comment is greater than a suspension threshold of 0.3 (block 1170), and the comment may be temporarily removed (block 1180).

The comment may be manually evaluated and determined to violate a policy (block 1190). The comment may be permanently removed and the abuse reports may be determined to be valid. The trust scores of the first and second user may be increased (block 1195). For example, assume that the first user has previously generated two valid reports and one invalid report and that the user's trust score is not adjusted based on other factors. Based on Equation (2), as stated above, the user's trust score had been set to 0.2. Abuse record manager 410 may adjust the trust score based on the newly received indication, from manual review interface 450, that the user has generated another valid report. The difference between the number of valid and invalid abuse reports generated by the user may now be 2 and, based on Equation (2), the user's trust score may be increased to 0.4. Similarly, assuming the second user has previously generated two valid abuse reports. Based on Equation (2), the second user's trust score may be increased to 0.45.

CONCLUSION

The foregoing description provides illustration and description, but is not intended to be exhaustive or to limit the invention to the precise form disclosed. Modifications and variations are possible in light of the above teachings or may be acquired from practice of the invention.

While an implementation of the systems and methods described herein has been described in the context of comments about documents, other implementations of the systems and methods described herein may be applied with respect to comments (or reviews) generated by users about the content of documents (e.g., about a product, a business, a book, or a published paper represented in a document). Thus, for example, a comment (or review) may be associated with a particular product rather than a particular document describing the product, and may be provided to a user in connection with a first document about the particular product in a first context and may be provided to a user in connection with a second document about the particular product in a second context.

For example, an implementation of the systems and methods described herein may be applied to ranking of users who report abuse of business reviews in connection with, for example, a local search service (e.g., users who report abusive business reviews in Google Maps). As another example, an implementation of the systems and methods described herein may be applied to ranking of users who report abuse of products reviews in connection with, for example, a product search service (e.g., users who report abuse of product reviews in Google Product Search). As yet another example, an implementation of the systems and methods described herein may be applied to ranking of users who report abuse of reviews of books or published papers.

For example, while series of blocks have been described with regard to FIGS. 8-11, the order of the blocks may be modified in other implementations. Further, non-dependent blocks may be performed in parallel.

Also, certain portions of the implementations may have been described as "logic" or a "component" that performs one or more functions. The terms "logic" or "component" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

It should be emphasized that the term "comprises/comprising," when used in this specification, is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method performed by one or more server devices, the method comprising:
   receiving, by one or more processors associated with the one or more server devices, an abuse report from a user, the abuse report indicating that a comment, associated with a document or associated with a content of the document, violates a policy associated with providing comments to users;
   determining, by the one or more processor associated with the one or more server devices, a quantity of valid abuse reports previously generated by the user;
   determining, by the one or more processor associated with the one or more server devices, a quantity of invalid abuse reports previously generated by the user;
   determining, by the one or more processors associated with the one or more server devices, a trust score of the user, the trust score being based on a difference between the quantity of valid abuse reports and the quantity of invalid abuse reports;
   generating or adjusting, by the one or more processors associated with the one or more server devices, a removal score of the comment based on the trust score of the user;
   comparing, by the one or more processors associated with the one or more server devices, the removal score to a removal threshold;
   removing, by the one or more processors associated with the one or more server devices, the comment from further presentation to users when the removal score of the comment satisfies the removal threshold;
   generating, by the one or more processors associated with the one or more server devices, an abuse record for the comment when the removal score of the comment does not satisfy the removal threshold;
   placing, by the one or more processors associated with the one or more server devices, the abuse record for the comment in a queue for review;
   providing, by the one or more processors associated with the one or more server devices, the abuse record to a review interface;
   receiving, by the one or more processors associated with the one or more server devices and from the review interface, an indication of whether the abuse report is valid; and
   adjusting, by the one or more processors associated with the one or more server devices, the trust score based on the received indication.

2. The method of claim 1, further comprising:
   determining that the removal score of the comment satisfies a suspension threshold that does not satisfy the removal threshold; and
   temporarily suspending the comment from being provided to users based on determining that the removal score of the comment satisfies the suspension threshold.

3. The method of claim 1, further comprising:
   receiving an abuse report about the comment from another user;
   retrieving a trust score of the other user; and
   adjusting the removal score of the comment based on the retrieved trust score of the other user.

4. The method of claim 3, where adjusting the removal score of the comment based on the retrieved trust score associated with the other user includes:
   adding the trust score of the other user to the removal score of the comment.

5. The method of claim 1, further comprising:
   adjusting the trust score of the user based on an author score of the user, where the author score of the user is based on at least one of:
      ratings, of comments authored by the user, by other users, or
      a quantity of times comments, authored by the user, are accessed by other users.

6. The method of claim 1, further comprising:
   adjusting the trust score of the user based on a rater score of the user, where the rater score of the user is based on how often the user gives a particular comment a same rating as a majority of other users that have rated the particular comment.

7. The method of claim 1, further comprising:
   adjusting the trust score of the user based on a publisher score of the user, where the publisher score of the user is based on at least one of:
      a rank score of a second document associated with the user, or
      a number of times that a third document associated with the user is accessed by other users.

8. The method of claim 1, further comprising:
   adjusting the trust score of the user based on a certification of the user, where the certification of the user is an indication of the user's knowledge of policies associated with providing comments to users.

9. The method of claim 1, where the trust score of the user is based on a logistic function that takes as an input the difference between the quantity of valid abuse reports previously generated by the user and the quantity of invalid abuse reports previously generated by the user.

10. A device comprising:
   a memory to store a user profile that includes a trust score of a user,
      the trust score being based on a difference between a quantity of valid abuse reports previously generated by the user and a quantity of invalid abuse reports previously generated by the user; and
   a processor to:
      implement an abuse report review queue,
         the abuse report review queue receiving an abuse record and providing the abuse record to a review interface;
      implement the review interface, the review interface providing an abuse report to an operator and receiving an indication whether the abuse report is valid;
receive the abuse report,
the abuse report indicating that a comment, associated with a document or associated with a content of the document, violates a policy associated with providing comments to users;
determine the quantity of valid abuse reports previously generated by the user;
determine the quantity of invalid abuse reports previously generated by the user;
determine the trust score of the user from the user profile,
the trust score being based on a difference between the quantity of valid abuse reports and the quantity of invalid abuse reports;
generate or adjust a removal score of the comment based on the retrieved trust score of the user;
provide an indication to delete the comment without review by an operator when the removal score of the comment satisfies a removal threshold;
generate an abuse record and provide the abuse record to the abuse report review queue when the removal score of the comment does not satisfy the removal threshold;
receive another abuse report about the comment from another user;
retrieve a trust score of the other user from a user profile associated with the other user; and
adjust the removal score of the comment by combining the trust score of the other user to the removal score of the comment.

11. The device of claim 10, where
the review interface is to provide the indication whether the abuse report is valid to the processor, and
the processor is to adjust the trust score of the user based on whether the abuse report is valid.

12. The device of claim 10, where the processor is further to:
determine that the removal score of the comment satisfies a suspension threshold, where the suspension threshold does not satisfy the removal threshold; and
label the comment for temporary removal based on determining that the removal score of the comment satisfies the suspension threshold.

13. The device of claim 10, where the processor is further to:
adjust the trust score of the user based on an author score of the user, where the author score of the user is based on at least one of:
ratings of comments, authored by the user, by other users, or
a quantity of times comments, authored by the user, are accessed by other users.

14. The device of claim 10, where the processor is further to:
adjust the trust score of the user based on a rater score of the user, where the rater score of the user is based on how often the user gives a particular comment a same rating as a majority of other users that have rated the particular comment.

15. The device of claim 10, where the processor is further to:
adjust the trust score of the user based on a publisher score of the user, where the publisher score of the user is based on at least one of:
a rank score of a second document associated with the user, or
a number of times a third document, associated with the user, is accessed by other users.

16. The device of claim 10, where the processor is further to:
adjust the trust score of the user based on a certification of the user, where the certification of the user is an indication of the user's knowledge of policies associated with providing comments to users.

17. One or more non-transitory memory devices comprising instructions executable by one or more processors, the instructions comprising:
one or more instructions to receive an abuse report from a user,
the abuse report indicating that a comment, associated with a document or associated with a content of the document, violates a policy associated with providing comments to users;
one or more instructions to determine a quantity of valid abuse reports previously generated by the user;
one or more instructions to determine a quantity of invalid abuse reports previously generated by the user;
one or more instructions to determine a trust score of the user,
the trust score being based on a difference between the quantity of valid abuse reports and the quantity of invalid abuse reports;
one or more instructions to generate or adjust a removal score of the comment based on the retrieved trust score of the user;
one or more instructions to determine whether the removal score of the comment satisfies a removal threshold;
one or more instructions to delete the comment without input from an operator when the removal score of the comment satisfies the removal threshold;
one or more instructions to determine whether the removal score of the comment satisfies a suspension threshold when the removal score of the comment does not satisfy the removal threshold, the suspension threshold not satisfying the removal threshold;
one or more instructions to temporarily suspend the comment from being provided to users when the removal score of the comment satisfies the suspension threshold;
one or more instructions to generate an abuse record for the comment and place the abuse record for the comment in an abuse report review queue when the removal score of the comment does not satisfy the removal threshold;
one or more instructions to provide the abuse record to an operator;
one or more instructions to receive, from the operator, an indication whether the abuse report is valid; and
one or more instructions to adjust the trust score of the user based on the received indication.

18. The one or more memory devices of claim 17, where the instructions further include:
one or more instructions to adjust the trust score of the user based on:
an author score of the user, where the author score of the user is based on at least one of:
ratings of comments, authored by the user, by other users, or
a quantity of times comments, authored by the user, are accessed by other users.

19. The one or more memory devices of claim 17, where the instructions further include:

one or more instructions to adjust the trust score of the user based on:
  a rater score of the user, where the rater score of the user is based on how often the user gives a particular comment a same rating as a majority of other users that have rated the particular comment.

20. The one or more memory devices of claim 17, where the instructions further include:
one or more instructions to adjust the trust score of the user based on:
  a publisher score of the user, where the publisher score of the user is based on at least one of:
    a rank score of a second document associated with the user, or
    a number of times a third document, associated with the user, is accessed by other users.

21. The one or more memory devices of claim 17, where the instructions further include:
one or more instructions to adjust the trust score of the user based on:
  a certification of the user, where the certification of the user is an indication of the user's knowledge of policies associated with providing comments to users.

* * * * *